US008341574B2

(12) United States Patent
Gandikota et al.

(10) Patent No.: US 8,341,574 B2
(45) Date of Patent: Dec. 25, 2012

(54) CROSSTALK TIME-DELAY ANALYSIS USING RANDOM VARIABLES

(75) Inventors: Ravikishore Gandikota, Ann Arbor, MI (US); Li Ding, San Jose, CA (US); Peivand Tehrani, Camirillo, CA (US); Nahmsuk Oh, Goleta, CA (US); Alireza Kasnavi, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 320 days.

(21) Appl. No.: 12/399,704

(22) Filed: Mar. 6, 2009

(65) Prior Publication Data

US 2010/0229136 A1 Sep. 9, 2010

(51) Int. Cl.
*G06F 17/50* (2006.01)
(52) U.S. Cl. ........................ 716/113; 716/115
(58) Field of Classification Search ................ 716/129, 716/106, 115, 113
See application file for complete search history.

(56) References Cited

U.S. PATENT DOCUMENTS

| 6,405,348 | B1 | 6/2002 | Fallah-Tehrani | |
|---|---|---|---|---|
| 6,507,935 | B1* | 1/2003 | Aingaran et al. | 716/115 |
| 6,907,586 | B1* | 6/2005 | Al-Dabagh et al. | 716/113 |
| 7,761,826 | B1* | 7/2010 | Thanvantri et al. | 716/108 |
| 2006/0248485 | A1* | 11/2006 | Foreman et al. | 716/6 |
| 2009/0288050 | A1* | 11/2009 | Celik et al. | 716/6 |
| 2011/0025391 | A1* | 2/2011 | Amrutur et al. | 327/170 |

FOREIGN PATENT DOCUMENTS
WO 2008145535 A1 12/2008

OTHER PUBLICATIONS

Shrivastava, Sachin et al., "Crosstalk Analysis using Reconvergence Correlation", In: Proc. of the 2006 Asia and South Pacific Design Automation Conference, 2006, pp. 79-83.
Tetelbaum, Alexander, "Statistical STA: Crosstalk Aspect" pp. 1-6, ICIDT07, 1-4244-0757-5/07 IEEE.

* cited by examiner

*Primary Examiner* — Vuthe Siek
*Assistant Examiner* — Mohammed Alam
(74) *Attorney, Agent, or Firm* — Park, Vaughan, Fleming & Dowler LLP; Laxman Sahasrabuddhe

(57) ABSTRACT

Embodiments of a computer system, a method, an integrated circuit and a computer-program product (i.e., software) for use with the computer system are described. These devices and techniques may be used to calculate the total time delay in a signal path due to crosstalk from a group of crosstalk aggressors that are associated with a group of signal paths. In order to properly account for statistical behaviors in the switching times and directions of the switching patterns in the group of signal paths, the time-delay contribution from each of these crosstalk aggressors may be modeled as a corresponding statistical random variable. Because the number of crosstalk aggressors are usually much larger than the number of stages in the signal path, the calculated total path delay may be less pessimistic. Furthermore, in order to detect potential timing violations, the time-delay contributions from additional dominant crosstalk aggressors can be modeled using non-statistical worst-case deterministic values.

22 Claims, 5 Drawing Sheets

— 300

```
CALCULATE TIME-DELAY CONTRIBUTIONS OF A FIRST GROUP OF CROSSTALK
AGGRESSORS TO A TOTAL TIME DELAY OF A SIGNAL PATH, WHERE THE FIRST
GROUP OF CROSSTALK AGGRESSORS IS ASSOCIATED WITH A FIRST GROUP OF
SIGNAL PATHS AND GIVES RISE TO CROSSTALK DELAY IN THE SIGNAL PATH,
AND WHERE THE INDIVIDUAL TIME-DELAY CONTRIBUTIONS OF THE FIRST
GROUP OF CROSSTALK AGGRESSORS ARE MODELED WITH CORRESPONDING
RANDOM VARIABLES
310
```

↓

```
CALCULATE TIME-DELAY CONTRIBUTIONS OF A SECOND GROUP OF
CROSSTALK AGGRESSORS TO THE TOTAL TIME DELAY OF THE SIGNAL PATH,
WHERE THE TIME-DELAY CONTRIBUTIONS OF THE SECOND GROUP OF
CROSSTALK AGGRESSORS ARE MODELED USING CORRESPONDING NON-
STATISTICAL MAXIMUM VALUES
(OPTIONAL)
312
```

↓

```
DETERMINE THE TOTAL TIME DELAY OF THE SIGNAL PATH BASED AT LEAST
IN PART ON THE CALCULATED TIME-DELAY CONTRIBUTIONS
314
```

↓

```
ESTIMATE A PROBABILITY OF THE TOTAL TIME DELAY OF THE SIGNAL PATH
(OPTIONAL)
316
```

- CROSSTALK-AGGRESSOR PARAMETERS 510-1
  - CROSSTALK AGGRESSOR 512-1
  - SIGNAL PATH(S) 514-1
  - RANDOM VARIABLE 516-1
  - DISTRIBUTION (OPTIONAL) 518-1
  - MAXIMUM VALUE 520-1
  - LOGICAL CORRELATION (OPTIONAL) 522-1
  - ...
- CROSSTALK-AGGRESSOR PARAMETERS 510-2
- ...

- TIME-DELAY CONTRIBUTIONS 610-1
  - SIGNAL PATH 612-1
  - CROSSTALK AGGRESSOR 512-1
  - SIGNAL PATH(S) 514-1
  - TIME-DELAY CONTRIBUTION 614-1
  - CROSSTALK AGGRESSOR 512-2
  - SIGNAL PATH(S) 514-2
  - TIME-DELAY CONTRIBUTION 614-2
  - ...
- TIME-DELAY CONTRIBUTIONS 610-2
- ...

CROSSTALK TIME-DELAY ANALYSIS USING RANDOM VARIABLES

BACKGROUND

1. Field

Embodiments of the present disclosure relate to circuit simulators and analysis of circuits. More specifically, embodiments of the present disclosure relate to a technique for estimating crosstalk-induced time delay in a signal path using random variables for individual crosstalk aggressors.

2. Related Art

When crosstalk is present between signal nets or paths, their effect on the delay values computed during timing analysis is often determined on a stage-by-stage basis (where each stage includes at least one driver coupled to at least one receiver). Furthermore, in order to detect potential timing violations, worst-case values are often used for the time-delay contributions from each of the stages.

However, using worst-case values for the time-delay contributions is typically too conservative because during a given clock cycle some crosstalk aggressors may not switch, may switch in opposite directions, and/or may not switch at exactly the desired time. Hence, the probability that the worst-case delay value will occur during normal operation is typically very small. Consider an example where there are four crosstalk aggressors per stage in a ten-stage signal path. Suppose that the probability of a given crosstalk aggressor switching is 50% and that the probability of its switching in the opposite direction of the victim is 50%. Then the probability of occurrence of the worst-case crosstalk time delay on the signal path would be $(0.5 \cdot 0.5)^{-40}$, which corresponds to an unreasonably high mean time to failure of 38,300,000 years.

In an attempt to reduce the pessimism of such worst-case-based time-delay analysis, some approaches model the time-delay contributions from each of the stages as statistical random variables. However, the total path delay calculated using such approaches is still typically too conservative. Consequently, circuit designers may end up redesigning circuits to fix timing violations which are not likely to occur during normal operation, thereby increasing the time and cost for designing circuits.

Hence, there is a need for an analysis technique that calculates crosstalk-induced time delay without the above-described problems.

SUMMARY

One embodiment of this disclosure provides a computer system to simulate crosstalk in a signal path from a first group of signal paths using an electronic device. This signal path may include one or more series-coupled stages, where each of these stages includes a driver coupled to a receiver. During the simulations, the electronic device calculates time-delay contributions of a first group of crosstalk aggressors to a total time delay of the signal path, where the first group of crosstalk aggressors is associated with the first group of signal paths, and where the first group of crosstalk aggressors gives rise to crosstalk delay in the signal path. Note that the individual time-delay contributions of the first group of crosstalk aggressors are modeled with corresponding random variables. Then, the electronic device determines the total time delay of the signal path based at least in part on the calculated time-delay contributions.

The crosstalk in the signal path may be caused in part by capacitive coupling between the signal path and the first group of signal paths. Moreover, a given random variable for a time-delay contribution of a given crosstalk aggressor may be associated with a switching pattern in a corresponding one of the other signal paths. Additionally, a number of crosstalk aggressors in the first group of crosstalk aggressors may be much larger than a number of stages in the signal path.

In some embodiments, the electronic device calculates time-delay contributions of a second group of crosstalk aggressors to the total time delay of the signal path, where the time-delay contributions of the second group of crosstalk aggressors are modeled using corresponding non-statistical worst-case values. For example, for each series-coupled stage in the one or more series-coupled stages in the signal path, the second group of crosstalk aggressors may include a group of top-N crosstalk aggressors in a first ranking of crosstalk aggressors in each series-coupled stage, where the first ranking of crosstalk aggressors may be determined based at least in part on corresponding maximum time-delay contributions. Alternatively, the second group of crosstalk aggressors may include a group of top-N crosstalk aggressors in a second ranking of crosstalk aggressors for the signal path, where the second ranking of crosstalk aggressors is determined based at least in part on corresponding maximum time-delay contributions.

Furthermore, the first group of crosstalk aggressors may exclude crosstalk aggressors with known switching patterns and/or at least some crosstalk aggressors with logical correlation. For example, if the switching pattern of a first signal path in the first group of signal paths is known, the time-delay contribution of the first signal path may be modeled deterministically. Similarly, if two or more of the crosstalk aggressors are logically correlated, their time-delay contributions may be modeled using a single random variable.

The random variables may include independent random variables. Moreover, the random variables may correspond to Gaussian distribution or a type of statistical distribution other than a Gaussian distribution. Note that a given random variable for a time-delay contribution of a given crosstalk aggressor may have values between a minimum value and a maximum value. For example, the maximum value (or a magnitude of the minimum value) may be a fraction of the total time delay of a given stage in the signal path. This fraction may correspond to a crosstalk peak voltage of crosstalk corresponding to the given crosstalk aggressor over a summation of crosstalk peak voltages of the crosstalk corresponding to crosstalk aggressors in the given stage in the first group of crosstalk aggressors.

In some embodiments, the electronic device estimates a probability of the total time delay of the signal path. Note that an upper bound on this probability may be calculated using an inequality relationship, such as Hoeffding's inequality.

Another embodiment provides a method for simulating crosstalk in the signal path from the first group of signal paths using the electronic device, such as a computer system or an integrated circuit. This method may include at least some of the preceding operations.

Another embodiment provides the computer system. This computer system may be configured to perform at least some of the preceding operations.

Another embodiment provides a computer-program product for use in conjunction with the computer system. This computer-program product may include instructions corresponding to at least some of the preceding operations.

Another embodiment provides the integrated circuit. This integrated circuit may be configured to perform at least some of the preceding operations.

BRIEF DESCRIPTION OF THE FIGURES

FIG. 3 is a flowchart illustrating a method for simulating crosstalk in the signal path of FIG. 2 in accordance with an embodiment of the present disclosure.

FIG. 5 is a block diagram illustrating a data structure in accordance with an embodiment of the present disclosure.

FIG. 6 is a block diagram illustrating a data structure in accordance with an embodiment of the present disclosure.

Note that like reference numerals refer to corresponding parts throughout the drawings.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a computer system, a method, an integrated circuit and a computer-program product (i.e., software) for use with the computer system are described. These devices and techniques may be used to calculate the total time delay in a signal path due to crosstalk from a group of crosstalk aggressors that are associated with a group of signal paths. In order to properly account for statistical behaviors in the switching times and directions of the switching patterns in the group of signal paths, the time-delay contribution from each of these crosstalk aggressors may be modeled as a corresponding statistical random variable. Because the number of crosstalk aggressors is usually much larger than the number of stages in the signal path, the calculated total time delay with statistical modeling may be less conservative. Furthermore, in order to detect potential timing violations, the time-delay contributions from additional dominant crosstalk aggressors can be modeled using non-statistical deterministic values.

By statistically calculating the total time delay, this timing-analysis technique can reduce the number of unnecessary timing violations that are reported by a timing analysis tool. Consequently, this timing-analysis technique can decrease the time and cost of circuit design, thereby increasing customer satisfaction and retention.

Figure 1:
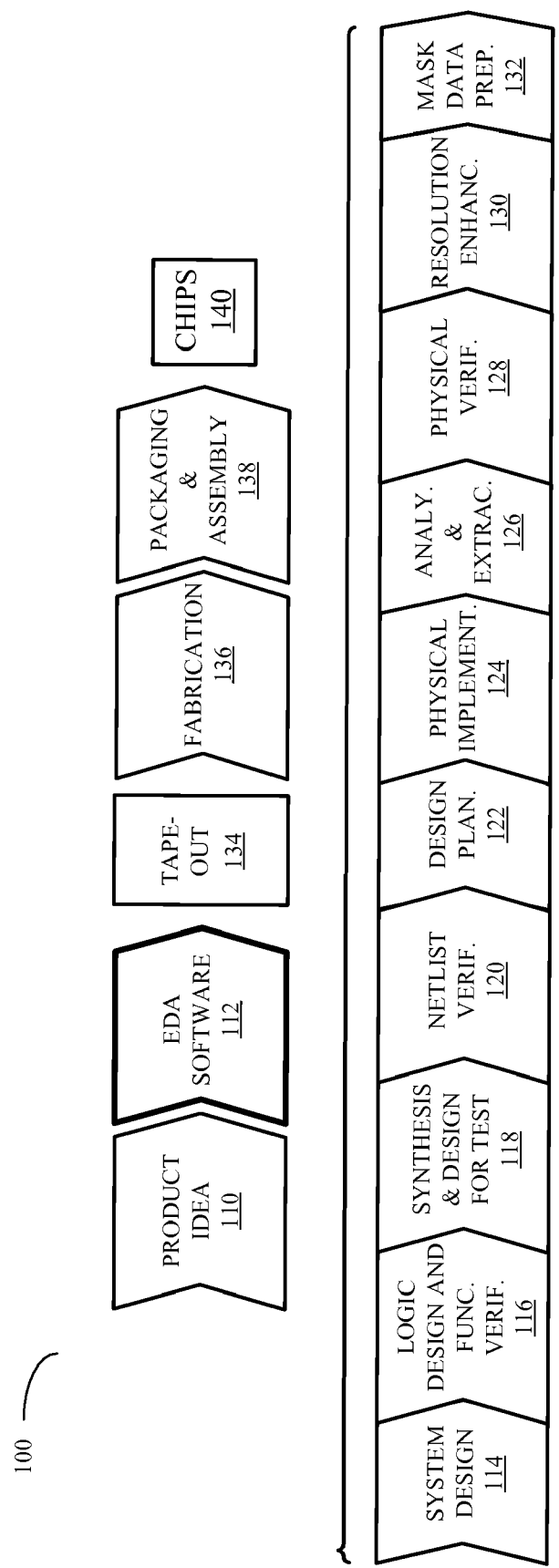
FIG. 1 is flowchart illustrating various operations in the design and fabrication of an integrated circuit in accordance with an embodiment of the present disclosure.

We now describe embodiments of design and fabrication of integrated circuits or chips. FIG. 1 is flowchart 100 illustrating the various operations in the design and fabrication of an integrated circuit. This process starts with the generation of a product idea (110), which is realized during a design process that uses electronic design automation (EDA) software (112). When the design is finalized, it can be taped-out (134). After tape-out, a semiconductor die is fabricated (136) and packaging and assembly processes (138) are performed, which ultimately result in finished chips (140).

Note that the design process that uses EDA software (112) includes operations 114-132, which are described below. This design flow description is for illustration purposes only. In particular, this description is not meant to limit the present disclosure. For example, an actual integrated circuit design may require a designer to perform the design operations in a different sequence than the sequence described herein.

During system design (114), designers describe the functionality to implement. They can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect®, Saber®, System Studio®, and Designware® products.

Then, during logic design and functional verification (116), VHDL or Verilog code for modules in the circuit is written and the design is checked for functional accuracy. More specifically, the design is checked to ensure that it produces the correct outputs. Exemplary EDA software products from Synopsys, Inc. of Mountain View, Calif. that can be used at this stage include: VCS®, Vera®, Designware®, Magellan®, Formality®, ESP® and Leda® products. Next, during synthesis and design for test (118), VHDL/Verilog is translated to a netlist. This netlist can be optimized for the target technology. Additionally, tests can be designed and implemented to check the finished chips. Exemplary EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

Moreover, during netlist verification (120), the netlist is checked for compliance with timing constraints and for correspondence with the VHDL/Verilog source code. Exemplary EDA software products from Synopsys, Inc. of Mountain View, Calif. that can be used at this stage include: Formality®, Primetime®, and VCS® products.

Furthermore, during design planning (122), an overall floor plan for the chip is constructed and analyzed for timing and top-level routing. Exemplary EDA software products from Synopsys, Inc. of Mountain View, Calif. that can be used at this stage include: Astro® and IC Compiler® products.

Additionally, during physical implementation (124), the placement (positioning of circuit elements) and routing (connection of the same) occurs. Exemplary EDA software products from Synopsys, Inc. of Mountain View, Calif. that can be used at this stage include: the Astro® and IC Compiler® products. Then, during analysis and extraction (126), the circuit function is verified at a transistor level, which permits refinement. Exemplary EDA software products from Synopsys, Inc. of Mountain View, Calif. that can be used at this stage include: Astrorail®, Primerail®, Primetime®, and Star RC/XT® products.

Next, during physical verification (128), the design is checked to ensure correctness for: manufacturing, electrical issues, lithographic issues, and circuitry. Exemplary EDA software products from Synopsys, Inc. of Mountain View, Calif. that can be used at this stage include the Hercules® product. Moreover, during resolution enhancement (130), geometric manipulations of the layout are performed to improve manufacturability of the design. Exemplary EDA software products from Synopsys, Inc. of Mountain View, Calif. that can be used at this stage include: Proteus®, Proteus®AF, and PSMGED® products.

Additionally, during mask-data preparation (132), the 'tape-out' data for production of masks to produce finished chips is provided. Exemplary EDA software products from Synopsys, Inc. of Mountain View, Calif. that can be used at this stage include the Cats® family of products.

Embodiments of the present disclosure can be used during one or more of the above-described stages. Specifically, in some embodiments the present disclosure can be used during system design (114) and/or logic design and functional verification (116), for example, during timing analysis of circuits.

Figure 2:
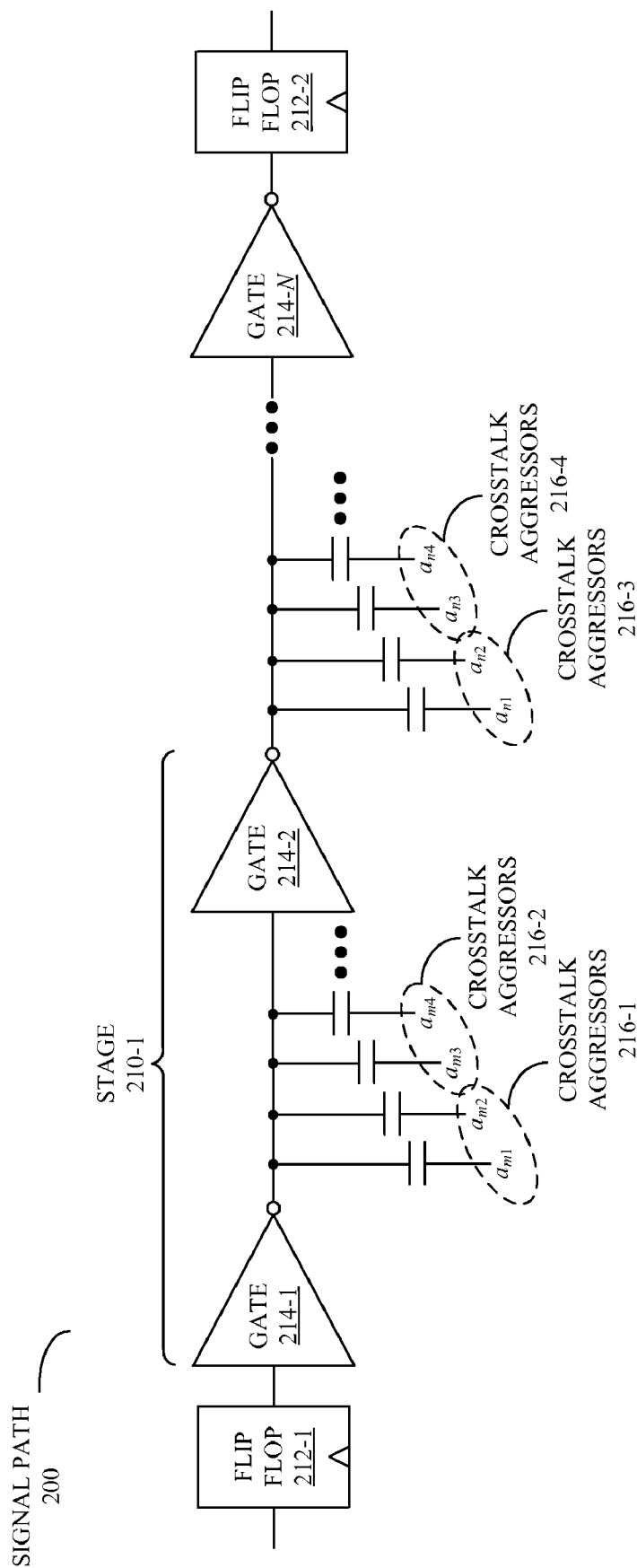
FIG. 2 is a block diagram illustrating a signal path and crosstalk aggressors in accordance with an embodiment of the present disclosure.

We now describe embodiments of a technique for simulating crosstalk in a signal path. FIG. 2 presents a block diagram illustrating a signal path 200 in a circuit and crosstalk aggressors 216. In signal path 200, flip flops 212 (or ports) are electrically coupled to a sequence of series-coupled stages, such as stage 210-1. Each of these stages includes one or more drivers (such as logic gate 214-1) and one or more receivers (such as logic gate 214-2). For example, each of logic gates 214 may be a NAND or a NOR gate in an analog circuit, a digital circuit or a mixed signal circuit. More generally, logic gates 214 may include gates with one or more transistors.

Furthermore, capacitive coupling with crosstalk aggressors 216, which are associated with corresponding switching patterns in a group of signal paths (not shown), result in time delays of electrical signals conveyed in signal path 200. For example, the capacitive coupling may be associated with parasitic capacitances between signal path 200 and the group of signal paths.

In the discussion that follows, time-delay contributions due to crosstalk from a first group of crosstalk aggressors, which includes at least a subset of the crosstalk aggressors for each stage (such as crosstalk aggressors 216-1 and 216-3), are modeled using statistical random variables. Because the number of crosstalk aggressors that are modeled as statistical random variables is much larger than the number of stages in a path, the calculated total time delay of switching path 200 is more realistic and less conservative, thereby preventing unnecessary timing violations. For example, the time-delay contributions of at least four crosstalk aggressors per stage, for a total of at least twenty or at least forty crosstalk aggressors in switching path 200, may be modeled as statistical random variables.

Note that the statistical random variables may include independent random variables. However, in other embodiments the statistical random variables are not independent. Moreover, the statistical random variables may correspond to a Gaussian distribution and/or a type of statistical distribution other than a Gaussian distribution. In addition, a given statistical random variable for the time-delay contribution of a given crosstalk aggressor in the first group of crosstalk aggressors may have values between a minimum value and a maximum value. The time-delay contribution for a given crosstalk aggressor may be obtained in multitude of ways. As an example, the maximum value (or the magnitude of the minimum value) may be a fraction of the total time delay in a given stage in signal path 200. In particular, the maximum value of the time-delay contribution of the given crosstalk aggressor may be $$\Delta_i = \left(\frac{V_i}{\sum_{i=1}^{N} V_i}\right) \cdot \Delta,$$

where $V_i$ is the bump height (or peak crosstalk voltage) of the given crosstalk aggressor, the summation of the $V_i$'s for the N crosstalk aggressors in the given stage is the total bump height of the given stage, and $\Delta$ is total time delay of the given stage. Using this statistical approach, the worst-case total time delay ($\Delta_{statistical}$) associated with the first group of crosstalk aggressors is $$\Delta\text{statistical} = E(S) + k \cdot \sqrt{\sum_{i=1}^{M} \Delta_i^2},$$

where E(S) is the expectation value of the distribution, k is chosen according to the desired degree of confidence (e.g., k equals 3 for 99.7% confidence), and M is the total number of crosstalk aggressors in the first group of crosstalk aggressors. (This is in contrast with $$\Delta\text{worst\_case} = \sum_{i=1}^{M} \Delta_i$$

when worst-case time-delay contributions are used for all of the crosstalk aggressors.)

In general, crosstalk aggressors 216 include: the major or dominant crosstalk aggressors, crosstalk aggressors with known switching patterns, and/or crosstalk aggressors with logical correlation. In order to detect potential timing violations, in some embodiments, time-delay contributions for some of crosstalk aggressors 216 are modeled deterministically. For example, the time-delay contributions for a second group of crosstalk aggressors (such as crosstalk aggressors 216-2 and 216-4), which includes the dominant crosstalk aggressors, may be modeled using worst-case or maximum values. These dominant crosstalk aggressors may be identified on a stage-by-stage basis or for the entire signal path. For example, for each stage in signal path 200, the second group of crosstalk aggressors may include the top-N crosstalk aggressors. Alternatively, the second group of crosstalk aggressors may include the top-N crosstalk aggressors for signal path 200. In either case, the top-N crosstalk aggressors may be identified by ranking the time-delay contributions of crosstalk aggressors 216, and selecting those that have time-delay contributions greater than a threshold value.

Furthermore, in some embodiments crosstalk aggressors with known switching patterns and/or logical correlation may also be modeled deterministically. For example, if the switching pattern for a given crosstalk aggressor is known, the resulting time-delay contribution may be calculated from the known switching pattern. Similarly, if two or more of the crosstalk aggressors are logically correlated, their time-delay contributions may be modeled using a single random variable. Note that two or more crosstalk aggressors may be logically correlated because the electrical signals in the two or more signal paths come from a common source (such as a flip-flop or port).

FIG. 3 is a flowchart illustrating a method 300 for simulating crosstalk in signal path 200 (FIG. 2), which may be performed by an electronic device (such as a computer system or an integrated circuit). During the simulations, the electronic device calculates time-delay contributions of the first group of crosstalk aggressors to the total time delay of the signal path (310), where the first group of crosstalk aggressors is associated with the first group of signal paths and gives rise to crosstalk delay in the signal path. Note that the individual time-delay contributions of the first group of crosstalk aggressors are modeled with corresponding random variables.

In some embodiments, the electronic device optionally calculates time-delay contributions of a second group of crosstalk aggressors to the total time delay of the signal path (312), where the time-delay contributions of the second group of crosstalk aggressors are modeled using corresponding non-statistical maximum values.

Then, the electronic device determines the total time delay of the signal path based at least in part on the calculated time-delay contributions (314).

In some embodiments, the electronic device optionally estimates a probability P of the total time delay of the signal path (316). For example, if independent random variables are used, an upper bound on this probability may be calculated using Hoeffding's inequality, i.e., $$P \le \exp\left(-\frac{M^2}{2}\right).$$

Based at least in part on the estimated probability, circuit designers may be able to sign-off on circuit designs if any simulated timing violations have probabilities that are less than a probability threshold (such as the probability threshold for a $3\sigma$, $5\sigma$, $7\sigma$ or $9\sigma$ event). Therefore, in some embodiments the circuit designers may use 'statistical signoff.' In particular, a circuit designer may tape out with statistical confidence based on one or more statistical metrics, such as a mean time to failure. This approach may be useful if one or more low-probability timing violations remain, such as a timing violation with a mean time to failure of 100 years. Alternatively, the circuit designers may only sign-off on circuit designs with no timing violations.

In some embodiments of method 300 there may be additional or fewer operations. Moreover, the order of the operations may be changed and/or two or more operations may be combined into a single operation.

Figure 4:
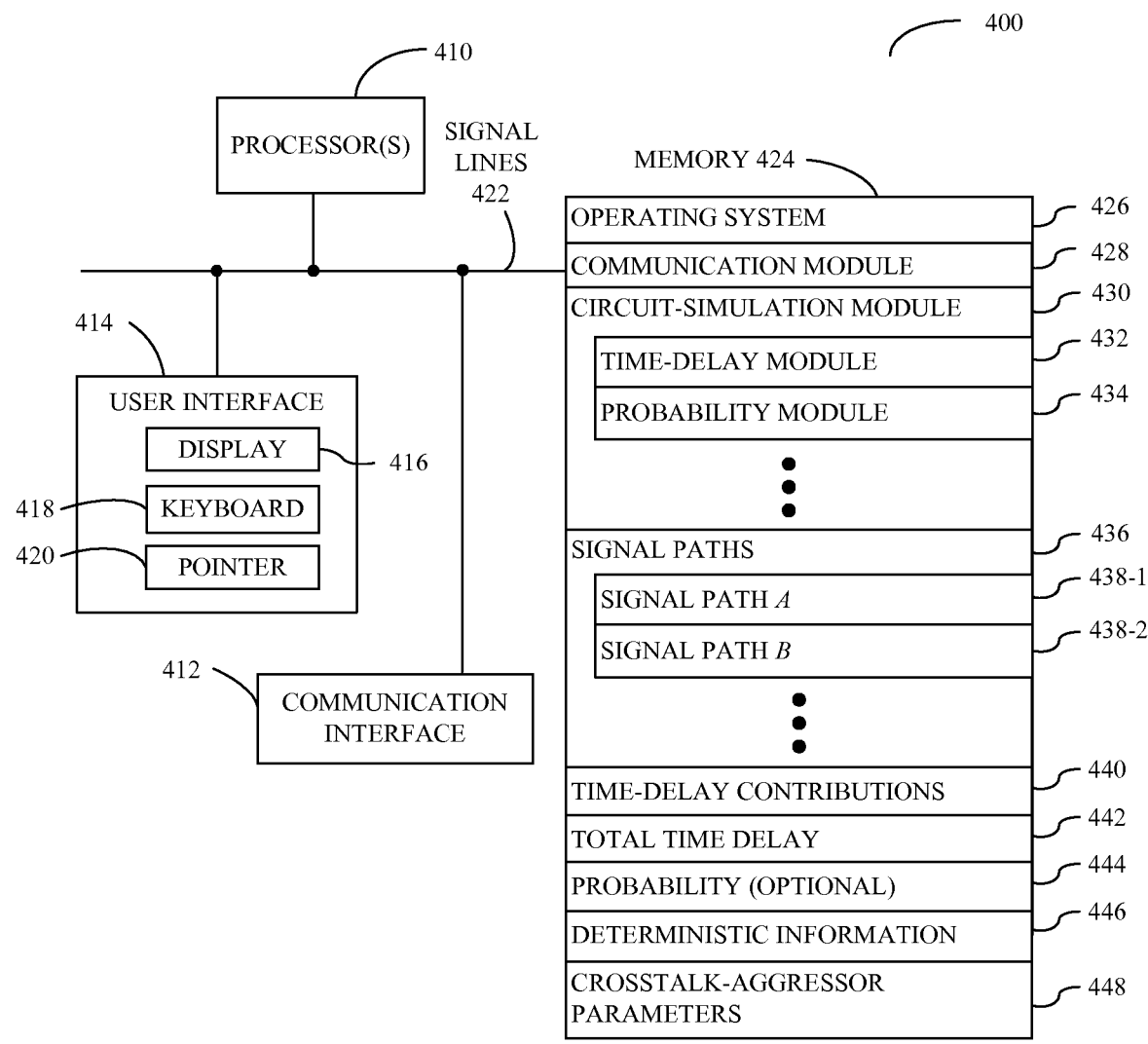
FIG. 4 is a block diagram illustrating a computer system that simulates crosstalk in the signal path of FIG. 2 in accordance with an embodiment of the present disclosure.

We now describe embodiments of a computer system that simulates crosstalk in signal path 200 (FIG. 2). FIG. 4 presents a block diagram illustrating a computer system 400. Computer system 400 includes: one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to computer system 400.

Memory 424 may also include multiple program modules (or sets of instructions), including circuit-simulation module 430 (or a set of instructions). Moreover, circuit-simulation module 430 may include: time-delay module 432 (or a set of instructions) and/or probability module 434 (or a set of instructions).

Time-delay module 432 may calculate time-delay contributions 440 in a given signal path from crosstalk aggressors associated with one or more signal paths 436, such as signal path A 438-1 and signal path B 438-2 (which may be included in one or more circuits). These time-delay contributions may be calculated using deterministic information 446 and/or crosstalk-aggressor parameters 448. Note that some of the time-delay contributions for some of the crosstalk aggressors may be random variables (such as independent random variables). However, the time-delay contributions of some of the crosstalk aggressors may be deterministic, such as using worst-case or maximum values of the associated time-delay contributions. For example, if the switching pattern in one or more signal paths 436 is known, the time-delay contributions for the corresponding crosstalk aggressors may be deterministically calculated by time-delay module 432. Furthermore, if two or more of the signal paths 436 are logically correlated, then the corresponding cross talk aggressors may be modeled using a single random variable. Information about the switching patterns and/or the logical correlations may be stored in deterministic information 446.

Then, time-delay module 432 may determine a total time delay 442 in the given signal path based at least in part on the estimated (random and/or deterministic) time-delay contributions 440. Furthermore, in some embodiments, probability module 434 may estimate an optional probability 444 of total time delay 442.

Instructions in the various modules in the memory 424 may be implemented in: a high-level procedural language, an object-oriented programming language, and/or in an assembly or machine language. Note that the programming language may be compiled or interpreted, e.g., configurable or configured, to be executed by the one or more processing units 410.

Computer system 400 may include a variety of devices, such as: a personal computer, a laptop computer, a server, a work station, a main-frame computer, and/or other device capable of manipulating computer-readable data.

Although computer system 400 is illustrated as having a number of discrete items, FIG. 4 is intended to be a functional description of the various features that may be present in computer system 400 rather than a structural schematic of the embodiments described herein. In practice, and as recognized by those of ordinary skill in the art, the functions of computer system 400 may be distributed over a large number of servers or computers, with various groups of the servers or computers performing particular subsets of the functions. Consequently, computer system 400 may be at one location or may be distributed across multiple locations, such as computing systems that communicate via a network (such as the Internet or an intranet).

In some embodiments, some or all of the functionality of computer system 400 may be implemented in one or more: application-specific integrated circuit (ASICs), field-programmable gate array (FPGAs), and/or one or more digital signal processors (DSPs). Thus, circuit analysis or simulations may be performed using an FPGA. Note that the functionality of computer system 400 may be implemented more in hardware and less in software, or less in hardware and more in software, as is known in the art.

We now discuss embodiments of data structures that may be used in computer system 400. FIG. 5 presents a block diagram illustrating a data structure 500. This data structure may include tables of crosstalk-aggressor parameters 510. For example, crosstalk-aggressor parameters 510-1 may include: an identifier for crosstalk aggressor 512-1, one or more associated signal paths 514-1, whether or not crosstalk aggressor 512-1 is a random variable 516-1, an optional distribution 518-1 if crosstalk aggressor 512-1 is a random variable, a maximum time-delay value 520-1 associated with crosstalk aggressor 512-1, and/or an optional logical correlation 522-1 between crosstalk aggressor 512-1 and one or more additional crosstalk aggressors.

FIG. 6 presents a block diagram illustrating a data structure 600. This data structure may include calculated time-delay contributions 610. For example, time-delay contributions 610-1 may include multiple groups of: an affected signal path (such as signal path 612-1), a contributing crosstalk aggressor (such as crosstalk aggressor 512-1), one or more signal paths (such as signal paths 514-1) associated with the crosstalk aggressor, and/or a calculated time-delay contribution (such as time-delay contribution 614-1).

In some embodiments, signal path 200 (FIG. 2), computer system 400 (FIG. 4), data structures 500 (FIG. 5) and/or 600 include fewer or additional components. Moreover, two or more components may be combined into a single component and/or a position of one or more components may be changed.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A method for simulating crosstalk in a signal path from a first group of signal paths using an electronic device, wherein the signal path includes one or more series-coupled stages, and wherein each stage in the one or more series-coupled stages includes a driver coupled to a receiver, comprising:
    calculating time-delay contributions of a first group of crosstalk aggressors to a total time delay of the signal path, wherein the first group of crosstalk aggressors is associated with the first group of signal paths and gives rise to crosstalk delay in the signal path, and wherein the individual time-delay contributions of the first group of crosstalk aggressors are modeled with corresponding random variables;
    calculating time-delay contributions of a second group of crosstalk aggressors to the total time delay of the signal path, wherein the time-delay contributions of the second group of crosstalk aggressors are modeled using corresponding non-statistical deterministic values;
    determining the total time delay of the signal path based at least in part on the calculated time-delay contributions of the first group crosstalk aggressors and the second group of crosstalk aggressors; and
    calculating an upper bound on a probability of the total time delay of the signal path using an inequality relationship.

2. The method of claim 1, wherein, for each series-coupled stage in the one or more series-coupled stages in the signal path, the second group of crosstalk aggressors includes a group of top-N crosstalk aggressors in a ranking of crosstalk aggressors in each series-coupled stage; and
    wherein the ranking of crosstalk aggressors is determined based at least in part on corresponding maximum time-delay contributions.

3. The method of claim 1, wherein the second group of crosstalk aggressors includes a group of top-N crosstalk aggressors in a ranking of crosstalk aggressors for the signal path; and
    wherein the ranking of crosstalk aggressors is determined based at least in part on corresponding maximum time-delay contributions.

4. The method of claim 1, wherein a number of crosstalk aggressors in the first group of crosstalk aggressors is much larger than a number of stages in the signal path.

5. The method of claim 1, wherein the crosstalk in the signal path is caused in part by capacitive coupling between the signal path and the first group of signal paths.

6. The method of claim 1, wherein the first group of crosstalk aggressors excludes crosstalk aggressors with known switching patterns.

7. The method of claim 1, wherein a given random variable for a time-delay contribution of a given crosstalk aggressor is associated with a switching pattern in a corresponding one of the other signal paths.

8. The method of claim 7, wherein, if the switching pattern of a first signal path in the first group of signal paths is known, the time-delay contribution of the first signal path is modeled deterministically.

9. The method of claim 1, wherein, if two or more of the crosstalk aggressors are logically correlated, their time-delay contributions are modeled using a single random variable.

10. The method of claim 1, wherein the random variables include independent random variables.

11. The method of claim 1, wherein the first group of crosstalk aggressors excludes at least some crosstalk aggressors which are logically correlated.

12. The method of claim 1, wherein the random variables correspond to a type of statistical distribution other than a Gaussian distribution.

13. The method of claim 1, wherein the inequality relationship includes Hoeffding's inequality.

14. The method of claim 1, wherein a given random variable for a time-delay contribution of a given crosstalk aggressor has values between a minimum value and a maximum value.

15. The method of claim 14, wherein the maximum value is a fraction of the total time delay of a given stage in the signal path; and
    wherein the fraction corresponds to a crosstalk peak voltage of crosstalk corresponding to the given crosstalk aggressor over a summation of crosstalk peak voltages of the crosstalk corresponding to crosstalk aggressors in the given stage in the first group of crosstalk aggressors.

16. A non-transitory computer-program product for use in conjunction with a computer system, the computer program product comprising a computer-readable storage medium and a computer-program mechanism embedded therein for configuring the computer system to simulate crosstalk in a signal path from a first group of signal paths, wherein the signal path includes one or more series-coupled stages, and wherein each stage in the one or more series-coupled stages includes a driver coupled to a receiver, the computer-program mechanism including:
    instructions for calculating time-delay contributions of a first group of crosstalk aggressors to a total time delay of the signal path, wherein the first group of crosstalk aggressors is associated with the first group of signal paths and gives rise to crosstalk delay in the signal path, and wherein the individual time-delay contributions of the first group of crosstalk aggressors are modeled with corresponding random variables;

instructions for calculating time-delay contributions of a second group of crosstalk aggressors to the total time delay of the signal path, wherein the time-delay contributions of the second group of crosstalk aggressors are modeled using corresponding non-statistical deterministic values;

instructions for determining the total time delay of the signal path based at least in part on the calculated time-delay contributions of the first group crosstalk aggressors and the second group of crosstalk aggressors; and instructions for calculating an upper bound on a probability of the total time delay of the signal path using an inequality relationship.

17. The non-transitory computer-program product of claim 16, wherein a given random variable for a time-delay contribution of a given crosstalk aggressor is associated with a switching pattern in a corresponding one of the other signal paths.

18. The non-transitory computer-program product of claim 17, wherein, if the switching pattern of a first signal path in the first group of signal paths is known, the time-delay contribution of the first signal path is modeled deterministically.

19. The non-transitory computer-program product of claim 16, wherein, if two or more of the crosstalk aggressors are logically correlated, their time-delay contributions are modeled using a single random variable.

20. The non-transitory computer-program product of claim 16, further comprising instructions for calculating a probability of the total time delay of the signal path.

21. The non-transitory computer-program product of claim 16, wherein a given random variable for a time-delay contribution of a given crosstalk aggressor has values between a minimum value and a maximum value.

22. A computer system, comprising:
a processor;
memory;
a program module, wherein the program module is stored in the memory and configured to be executed by the processor to simulate crosstalk in a signal path from a first group of signal paths, wherein the signal path includes one or more series-coupled stages, and wherein each stage in the one or more series-coupled stages includes a driver coupled to a receiver, the program module including:

instructions for calculating time-delay contributions of a first group of crosstalk aggressors to a total time delay of the signal path, wherein the first group of crosstalk aggressors is associated with the first group of signal paths and gives rise to crosstalk delay in the signal path, and wherein the individual time-delay contributions of the first group of crosstalk aggressors are modeled with corresponding random variables;

instructions for calculating time-delay contributions of a second group of crosstalk aggressors to the total time delay of the signal path, wherein the time-delay contributions of the second group of crosstalk aggressors are modeled using corresponding non-statistical deterministic values;

instructions for determining the total time delay of the signal path based at least in part on the calculated time-delay contributions of the first group crosstalk aggressors and the second group of crosstalk aggressors and instructions for calculating an upper bound on a probability of the total time delay of the signal path using an inequality relationship.

* * * * *